(12) United States Patent
Guan

(10) Patent No.: US 10,471,541 B2
(45) Date of Patent: Nov. 12, 2019

(54) WELDING ALONG A SEAM USING A MULTIPLE-POINT ALIGNMENT METHOD

(71) Applicant: EAGLEPICHER TECHNOLOGIES, LLC, Joplin, MO (US)

(72) Inventor: Feng Guan, Burnaby (CA)

(73) Assignee: EaglePicher Technologies, LLC, Joplin, MO (US)

( * ) Notice: Subject to any disclaimer, the term of this patent is extended or adjusted under 35 U.S.C. 154(b) by 62 days.

(21) Appl. No.: 13/748,033

(22) Filed: Jan. 23, 2013

(65) Prior Publication Data

US 2014/0207306 A1 Jul. 24, 2014

(51) Int. Cl.
*B23K 26/28* (2014.01)
*B23K 31/12* (2006.01)

(52) U.S. Cl.
CPC .......... *B23K 26/28* (2013.01); *B23K 31/125* (2013.01)

(58) Field of Classification Search
CPC .............................. B23K 26/28; B23K 31/125
USPC ......................................................... 700/302
See application file for complete search history.

(56) References Cited

U.S. PATENT DOCUMENTS

| | | | | |
|---|---|---|---|---|
| 4,104,499 A * | 8/1978 | Luttrell | ............... | B23K 9/028 219/125.11 |
| 4,642,752 A * | 2/1987 | Debarbieri | ........... | B23K 9/1274 219/124.34 |
| 5,053,971 A * | 10/1991 | Wood | ................. | B24B 9/148 33/505 |
| 5,304,773 A * | 4/1994 | Kilian | .................. | B23K 26/04 219/121.78 |
| 5,904,864 A * | 5/1999 | Nester | ................. | B23K 9/0288 219/124.34 |
| 6,376,801 B1 * | 4/2002 | Farrell | ................ | B23K 9/1274 219/124.34 |
| 6,447,278 B1 * | 9/2002 | Arruda | ................... | B29C 53/10 425/326.1 |
| 6,492,618 B1 * | 12/2002 | Flood | ................. | B23K 9/0286 219/125.11 |
| 2006/0081570 A1 * | 4/2006 | Schildgen | ............. | A61N 1/375 219/121.64 |
| 2006/0104734 A1 * | 5/2006 | Mathis | ................... | B23B 39/04 408/236 |
| 2008/0083817 A1 * | 4/2008 | Baumann | ............. | B23K 20/123 228/102 |
| 2008/0088704 A1 * | 4/2008 | Wendelken | .............. | G06T 7/62 348/188 |
| 2013/0119040 A1 * | 5/2013 | Suraba | ................ | B23K 9/0953 219/137 R |

(Continued)

OTHER PUBLICATIONS

CalculatorSoup, "Stadium Calculator", Mar. 18, 2010, CalculatorSoup.*

*Primary Examiner* — Thomas C Lee
*Assistant Examiner* — Charles Cai
(74) *Attorney, Agent, or Firm* — LSIP Law LLC; Linda Saltiel

(57) ABSTRACT

A method for generating a weld path aligned along a seam between two parts uses a computer having a control unit and a storage medium. The method includes aligning a crosshair line at a plurality of points along the seam and storing a position value for each of the plurality of points in the storage medium; calculating a width and a height of the seam based on the stored position values of each of the plurality of points; and generating the weld path based on the height and the width of the seam.

17 Claims, 3 Drawing Sheets

(56) References Cited

U.S. PATENT DOCUMENTS

2014/0008415 A1* 1/2014 Shen .................... B23K 9/0216
  228/10

* cited by examiner

WELDING ALONG A SEAM USING A MULTIPLE-POINT ALIGNMENT METHOD

BACKGROUND

Exemplary embodiments relate generally to a method of welding, such as laser welding, and more particularly, to a method of welding along a seam where the weld path is aligned to the seam. In a preferred embodiment, the disclosed method is used to weld along a seam for battery cells.

SUMMARY

Welding along a seam typically involves using nominal dimensions to generate a weld path along which a welding machine performs the welding procedure. A predetermined weld path is stored in the welding machines. An operator generally places the crosshair somewhere along the seam and the machine welds along the seam path in accordance with the predetermined weld path stored in the welding machine.

This method did not allow for any part-to-part variation in the dimensions of the weld path. Therefore, if there were any part-to-part variation, the weld path would not be aligned along the seam as it would slightly offset. Moreover, this caused increased welding quality issues as a result of misalignment. Furthermore, as welding failures are hard to detect, the misaligned welded parts have a higher rate of welding failures which go undetected.

There currently exists a need for a method of welding, which tolerates parts dimensions variations, i.e., variation in dimensions of a cell among a batch of parts that are to be welded together. Specifically, a method for welding is needed, where the weld path is aligned along the seam to provide a more consistent weld and reduce undetected welding failures.

In one aspect, a method of generating a weld path aligned along a seam between two parts may include using a computer having a control unit and a storage medium. The method includes aligning a crosshair line at a plurality of points along the seam and storing a position value for each of the plurality of points in the storage medium. A width and a height of the seam is calculated based on the stored position values of each of the plurality of points. Finally, the weld path is generated based on the height and the width of the seam by the control unit of the computer.

In another aspect, a welding machine may be used to weld along a seam by following the weld path generated by the method above. A practice run is performed prior to welding to confirm that the generated weld path is aligned along the seam. If the weld path is not aligned along the seam, the position of the weld path is adjusted to align the weld path to the seam.

In a further aspect, a welding machine may be used to weld along a path generated by using a computer having a control unit and a storage medium, where the control unit generates a new weld path, if it is determined that the initially generated weld path is not aligned along the seam.

In yet another aspect, a computer-readable medium may be used to store a program, which upon being executed, causes a processor to generate a weld path aligned along a seam between the parts that are to be welded together.

BRIEF DESCRIPTION OF THE DRAWINGS

The accompanying drawings, which are incorporated in and constitute a part of this specification, illustrate several embodiments of the invention and together with description, serve to explain the principles of the invention.

DETAILED DESCRIPTION OF THE EMBODIMENTS

Figure 1:
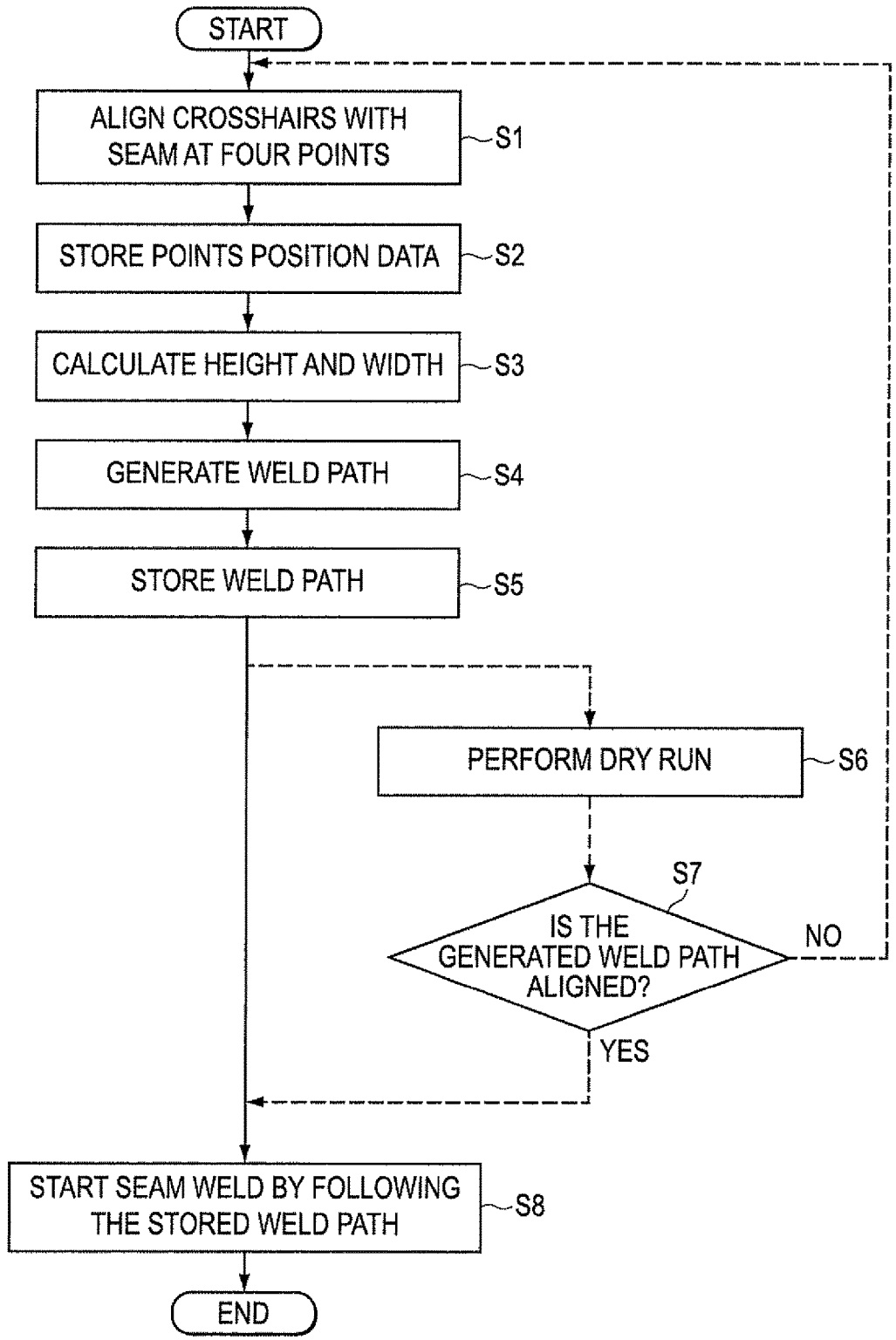
FIG. 1 is a flowchart showing an exemplary method of generating a weld path and welding along the generated weld path.

Hereinafter, a method of welding according to an exemplary embodiment of the invention will be described in detail with reference to the accompanying drawings. FIG. 1 illustrates a flowchart of a welding procedure employing a method of welding.

The welding procedure shown in FIG. 1 is provided to generate a customizable weld path along a seam between two parts that are to be welded together, followed by welding along the generated stored path. For example, during a batch of welding, each cell among a plurality of cells (a cell being defined as two parts that are to be welded together along a seam) may have different seam dimensions when compared to an adjacent cell, thereby requiring a customized weld path for each cell. The welding procedure shown in FIG. 1 provides a seam weld that may be substantially aligned along the seam between the two parts in each cell by following the method described below. The dashed lines shown in FIG. 1 show an optional path that may be followed for greater accuracy.

In step S1, the welding procedure for a given cell begins with aligning a crosshair line at a plurality of points along the seam and storing a position value for each point. The welding procedure, from this point on, will be described using four points aligned along the seam. However, additional points along the seam may be used for greater accuracy and better alignment. The position values of the points aligned along the seam and to the crosshair line are stored in a computer having a storage medium.

The computer used may be a Programmable Logic Controller (PLC), which is a digital computer used for automation of electromechanical processes, that can be used to generate the weld path. Furthermore, the PLC may wirelessly communicate with the welding machine and provide the generated weld path for welding along the seam. However, the computer used for generating the weld path is not limited to a PLC. For example, the computer may be a personal computer or a laptop computer, with a driver installed that can control a stepper motor used for welding, which may be connected to the welding machine through a communication network such as LAN. In another example, a workstation used to perform the welding may include the computer with an interactive interface which has a storage medium to store the position values.

The storage medium in the computer may be a volatile memory such as RAM, where the position values are only stored for each cell and the stored information is removed after the welding process is completed for the cell. Alternatively, the position values may be stored in a non-volatile memory such as E2ROM or EEPROM where the position values are stored throughout the welding process for a plurality of cells.

After the position values of the points along the seam are stored in the storage medium of the computer in step S2, a width and a height of the seam is calculated based on the stored position values in step S3 of FIG. 1.

Figure 2:
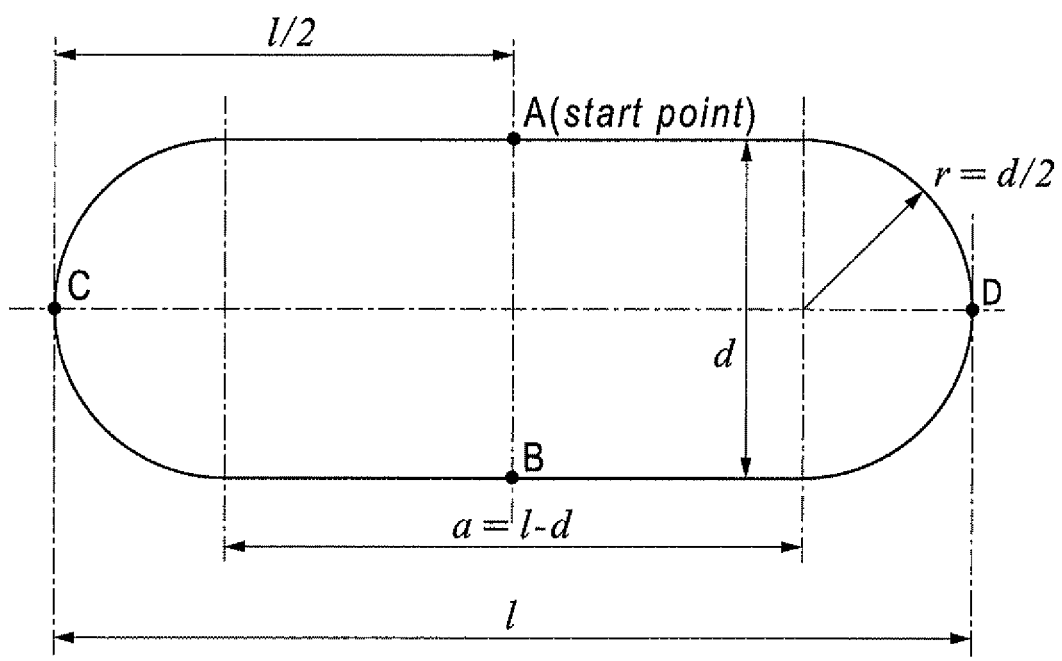
FIG. 2 shows an exemplary weld path which has been calculated by the method of one aspect of this invention.

FIG. 2 shows an exemplary method of calculating the height and the width of the seam based on the stored position values and generating the weld path based on the height and the width of the seam in more detail. The generated weld path may be substantially obround shaped (i.e. a shape being defined by two parallel horizontal lines enclosed by two semicircles on both ends, as shown in FIG. 2). However, it is to be understood that this method is not limited to this shape of the seam weld and that the method may be used to align a weld path with various dimensions of the seam resulting in different generated weld path shapes in other embodiments.

Figure 3A:
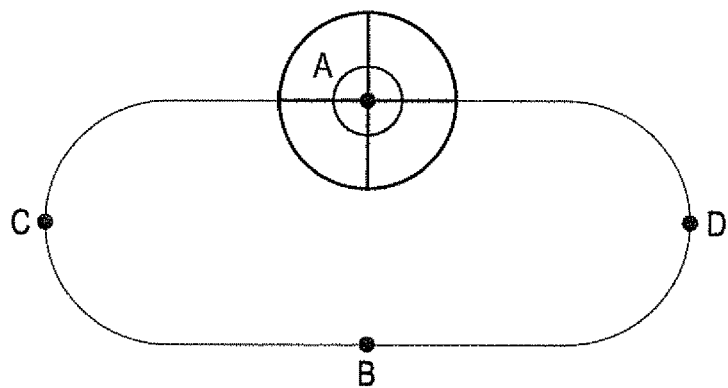
FIG. 3A through 3D show an exemplary image of a crosshair aligned along a plurality of points on the seam.

FIG. 3A shows the crosshair having a vertical line and a horizontal line aligned along the seam at point A.

Figure 3B:
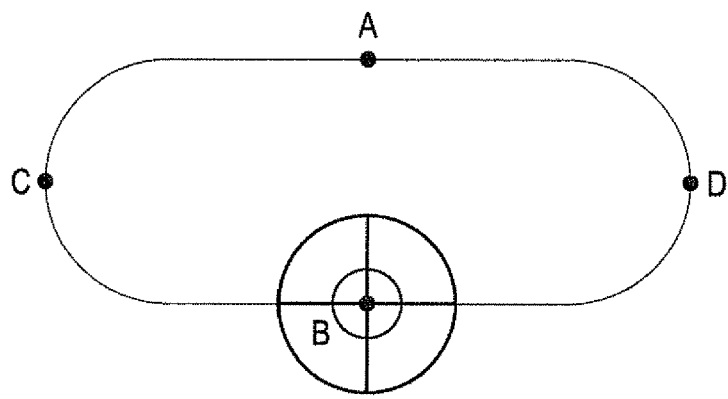

As shown in FIG. 3A, a horizontal line of the crosshair is aligned at a first point A along the seam between the two parts and a position value Ya is stored in the storage medium. It is to be understood that the first point may be aligned to a vertical line of the crosshair a position value Xa be stored in the storage medium in an alternate embodiment. After storing the position value Ya, the crosshair line is moved vertically to a second point B where the horizontal line of the crosshair is again aligned to the seam and position value Yb is stored in the storage medium, as shown in FIG. 3B.

The control unit then calculates a distance d between Ya and Yb, the distance d being defined as the height of the seam. Furthermore, a radius r of a semicircle enclosing the horizontal portion of the seam is calculated based on the distance d. The radius r is calculated based on Equation 1 below:

$$r=d/2 \quad \text{(Equation 1)}$$

Figure 3C:
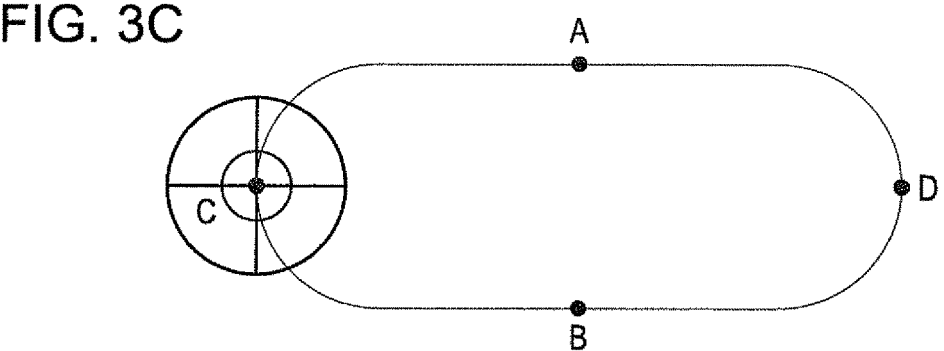
Figure 3D:
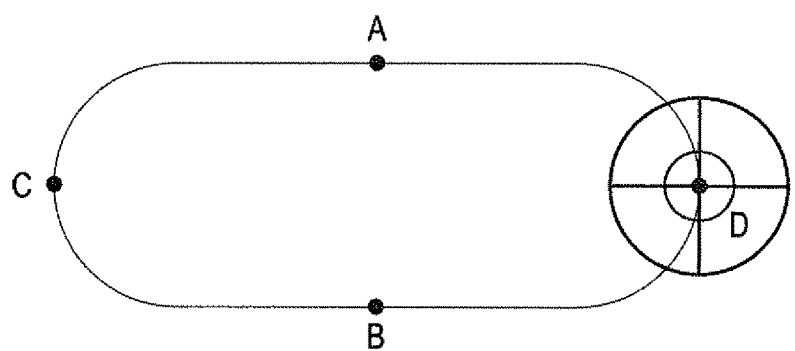

Next, the vertical line of the crosshair is aligned at a third point C along the seam between the two parts and a position value Xc is stored in the storage medium, as shown in FIG. 3C. After storing the position value Xc, the crosshair line is moved horizontally to a fourth point D where the vertical line of the crosshair is again aligned to the seam and position value Xd is stored in the storage medium, as shown in FIG. 3D.

The control unit then calculates a distance l between the Xc and Xd, the distance l being defined as the width of the seam. Furthermore, a distance a is calculated based on the distance d and distance l as shown in FIG. 2. The distance a is calculated based on Equation 2 below:

$$a=l-d \quad \text{(Equation 2)}$$

Next, in step S4 of the welding procedure shown in FIG. 1, a control unit of the computer generates a weld path based on the distances r, l and a.

In step S5, after the weld path is generated by the control unit of the computer, the generated weld path may be stored in the storage medium. In step S6, a practice run may be performed to confirm the alignment of the generated seam path to the seam between the two parts. In step S8, the welding machine starts welding along the generated seam path.

The generated weld path may be centered over the seam between the two parts in a given cell. That is, when the welding machine seam welds along the generated weld path, equal amounts of the two parts are melted together providing a more uniform weld that has a greater consistency.

In an embodiment, to ensure greater accuracy of the weld along the weld seam, a dry run is performed along the generated weld path, as shown at Step S6. A dry run refers to rotating the laser weld between the four points along the seam and confirming that the generated weld path and the actual seam are aligned. In step S7, if it is determined that the generated weld path is aligned to the seam between the two parts, the seam weld is started along the weld path.

However, if the generated weld path and the seam between the two parts are not aligned in Step S7, the crosshair is again aligned along the seam, as shown in FIG. 1. The new position values Ya1, Yb1, Xc1 and Xd1 are stored in the storage medium replacing the previous position values Ya, Yb, Xc and Xd. Furthermore, the new position values Ya1, Yb1, Xc1 and Xd1 are used to calculate new distances r1, l1, and a1. Finally, a new weld path is generated based on the new distances r1, l1, and a1. This new generated weld path may be stored in the storage medium replacing the previously generated weld path. Once the alignment is complete and the updated generated weld path is stored, another practice run may be performed to confirm that the updated stored weld path is aligned along the seam. However, a second practice run may not be performed and the welding machine may weld along the updated stored weld path. Finally, the welding machine starts welding along the new generated weld path.

Alternatively, for example, if the generated weld path and the seam between the two parts are not aligned in Step S7, the position values Ya, Yb, Xc and Xd are adjusted to align with the new crosshair position. This adjustment is done in small increments for greater accuracy and precision. The amount of adjustment increment is determined based on machine resolution and process accuracy requirement and can be as small as 0.001 inches. In a preferred embodiment, the crosshair line is adjusted in increments of 0.0005 inches. It is to be understood that the adjustment increment amount may be higher or lower depending on the need for accuracy and machine resolution. Once the position values Ya, Yb, Xc and Xd are corrected, the generated weld path is adjusted based on the new position values.

At the end of the welding along the seam between the two parts for a given cell, the crosshair is moved back to point A, as it prepares to generate a weld path for the next cell. Accordingly, the process is started all over again generating a custom path for the next cell based on its seam. The welding procedure may allow for the weld path to be right on the seam for each cell, even if there is a difference between the dimensions of the seams among the batch of cells. This allows for greater tolerance on parts dimension variation.

Generating a customized weld path for each of the parts to be welded together also reduces the need for dimension adjustment between workstations. By aligning the pieces at the work stations, the welding path may be more accurately aligned to the real parts, regardless of the hardware setting of the workstation. That is, there may be no need to adjust the hardware settings of a workstation since the weld paths are generated based, not on any predetermined nominal dimensions, but rather real dimensions of the pieces to be welded together.

Furthermore, a welding machine that welds along a seam by following the above described welding procedure provides a better weld because equal amounts of the two parts are being melted together. Thus, the weld area is always or almost always of the same composition, and therefore provides a more uniform weld. The welding method described also reduces the potential failure risk because welding failure is hard to detect. The novel method of welding described above allows for an improved weld of consistent quality, thereby reducing risk of device failure due to the welding.

In an embodiment, a computer-readable medium is provided that stores a program. The non-transitory computer-readable medium may be a floppy disk, USB drive, CD, DVD, micro USB drive or any other type of medium capable of storing a program that can be executed by a computer. The program, upon being executed, may cause a processor of the computer to follow the welding procedure described above. Thus, the welding procedure may be used by multiple welding machines simultaneously providing greater efficiency.

Other embodiments of the invention will be apparent to those skilled in the art from consideration of the specification and practice of the invention disclosed herein. It is intended that the specification and examples be considered as exemplary only, and are not intended to limit the scope of the invention. A true scope of and spirit of the invention is indicated by the following claims.

What is claimed is:

1. A method of actively controlling a welder to weld two parts along a seam pursuant to a weld path, and generating the weld path aligned along the seam between the two parts using a computer having a control unit and a storage medium, the method comprising:
    aligning a crosshair line at a plurality of points along the seam and storing a position value for each of the plurality of points in the storage medium, wherein aligning the crosshair line at a second point of the plurality of points comprises one of a horizontal movement or a vertical movement of the crosshair from and with respect to a first point of the plurality of points;
    calculating a width and a height of the seam based on the stored position values of each of the plurality of points;
    calculating a first distance between the stored position value of the first point of the plurality of points and the stored position value of the second point of the plurality of points;
    generating a virtual first line connecting the first point of the plurality of points and the second point of the plurality of points that defines a Y-direction;
    calculating a second distance between the stored position value of a third point of the plurality of points and the stored position value of a fourth point of the plurality of points;
    generating a virtual second line connecting the third point of the plurality of points and the fourth point of the plurality of points that defines an X-direction perpendicular to the Y-direction;
    calculating a radius of the seam by dividing the first distance in half;
    generating the entire weld path based on the height, the radius and the width of the seam, the generating of the weld path being performed by the control unit, wherein the generated weld path is centred over the seam in the Y-direction and centred over the seam in the X-direction;
    storing the generated weld path in the storage medium; and
    controlling the welder to weld along the seam by following the stored weld path.

2. A method of actively controlling a welder to weld two parts long a seam pursuant to a weld path, and for generating the weld path aligned along the seam between the two parts using a computer having a control unit and a storage medium, the method comprising:
    aligning a crosshair line at a first point on the seam and storing a first position value in the storage medium;
    aligning the crosshair line at a second point on the seam and storing a second position value in the storage medium, wherein aligning the crosshair line at the second point comprises a horizontal movement or a vertical movement of the crosshair from and with respect to the first point;
    aligning the crosshair line at a third point on the seam and storing a third position value in the storage medium;
    aligning the crosshair line at a fourth point on the seam and storing a fourth position value in the storage medium;
    calculating a first distance between the stored first position value and the stored second position value;
    generating a virtual first line connecting the first point and the second point that defines a Y-direction;
    calculating a radius of the seam based on the stored first position value and the stored second position value by dividing the first distance calculated in half;
    calculating a second distance between the stored third position value and the stored fourth position value;
    generating a virtual second line connecting the third point and the fourth point that defines an X-direction perpendicular to the Y-direction;
    calculating a third distance, the third distance defined by a difference between the first distance and the second distance;
    generating the weld path based on the first distance, the radius, the second distance, and the third distance, the generating of the weld path being performed by the control unit, wherein the second distance is a width of the seam and the first distance is a height of the seam;
    confirming an alignment of the generated weld path before welding, so as to confirm that the generated weld path corresponds to the seam, wherein the generated weld path is centred over the seam in the Y-direction and centred over the seam in the X-direction;
    storing the generated weld path in the storage medium; and
    controlling the welder to weld along the seam by following the stored weld path.

3. The method of claim 2, the method further comprising:
    performing a practice run after storing the weld path and prior to welding;
    confirming that the stored weld path is aligned to the seam between the two parts; and
    under the condition that the stored weld path and the seam are not aligned, adjusting the crosshair line at each of the first, second, third, and fourth points to align the crosshair line to the seam.

4. The method of claim 3, the method further comprising:
    adjusting the crosshair line at each of the first, second, third, and fourth points in increments of 0.0005 inches to align the crosshair line with the seam.

5. The method of claim 3, the method further comprising:
    correcting the stored first, second, third and fourth position values based on the adjustment of the crosshair line at each of the first, second, third, and fourth points; and
    adjusting the stored weld path based on the corrected first, second, third and fourth position values such that the stored weld path is aligned to the seam.

6. The method according to claim 2, wherein the generated weld path is in the shape of an obround.

7. The method of claim 2, the method further comprising welding along the seam by following the stored weld path, such that equal amounts of the two parts are melted together.

8. A non-transitory computer-readable medium storing a program, which upon being executed, causes a processor to actively control a welder to weld two parts along a seam pursuant to a weld path, and generate the weld path along the seam between the two parts by:
- aligning a crosshair line at a first point on the seam and storing a first position value in the storage medium;
- aligning the crosshair line at a second point on the seam and storing a second position value in the storage medium, wherein aligning the crosshair line at the second point comprises one of a horizontal movement or a vertical movement of the crosshair from and with respect to the first point;
- aligning the crosshair line at a third point on the seam and storing a third position value in the storage medium;
- aligning the crosshair line at a fourth point on the seam and storing a fourth position value in the storage medium;
- calculating a first distance between the stored first position value and the stored second position value;
- generating a virtual first line connecting the first point and the second point that defines a Y-direction;
- calculating a radius of the seam based on the stored first position value and the stored second position value by dividing the first distance in half;
- calculating a second distance between the stored third position value and the stored fourth position value;
- generating a virtual second line connecting the third point and the fourth point that defines an X-direction perpendicular to the Y-direction;
- calculating a third distance, the third distance defined by a difference between the first distance and the second distance;
- generating the weld path based on the first distance, the radius, the second distance, and the third distance, the generating the weld path being performed by the control unit, wherein the second distance is a width of the seam and the first distance is a height of the seam;
- confirming an alignment of the generated weld path before welding, so as to confirm that the generated weld path corresponds to the seam, wherein the generated weld path is centred over the seam in the Y-direction and centred over the seam in the X-direction;
- storing the generated weld path in the storage medium; and
- controlling the welder to weld along the seam by following the stored weld path.

9. The method of claim 1, the method further comprising:
- confirming an alignment of the generated weld path before welding, so as to confirm that the generated weld path corresponds to the seam.

10. The method of claim 9, the method further comprising:
- initiating welding if it is confirmed that the generated weld path corresponds to the seam.

11. The method of claim 2, the method further comprising:
- initiating welding if it is confirmed that the generated weld path corresponds to the seam.

12. The non-transitory computer-readable medium storing a program of claim 8, which upon being executed, further causes a processor to:
- initiate welding if it is confirmed that the generated weld path corresponds to the seam.

13. The method according to claim 1, wherein the generated weld path is in the shape of an obround.

14. The non-transitory computer-readable medium storing a program of claim 8, wherein the generated weld path is in the shape of an obround.

15. The method of claim 1, wherein the plurality of points includes no more than four points.

16. The method of claim 2, wherein the crosshair is aligned at no more than four points.

17. The non-transitory computer-readable medium storing a program of claim 8, wherein the crosshair is aligned at no more than four points.

* * * * *